US010174518B2

(12) United States Patent
Andersen

(10) Patent No.: US 10,174,518 B2
(45) Date of Patent: Jan. 8, 2019

(54) LATCH FITTING TOOL

(71) Applicant: SAFE AND CARE LTD., Hong Kong (CN)

(72) Inventor: Jesper Birk Andersen, Hong Kong (CN)

(73) Assignee: Safe and Care Ltd., Hong Kong (CN)

( * ) Notice: Subject to any disclaimer, the term of this patent is extended or adjusted under 35 U.S.C. 154(b) by 165 days.

(21) Appl. No.: 15/132,275

(22) Filed: Apr. 19, 2016

(65) Prior Publication Data

US 2016/0305159 A1 Oct. 20, 2016

(30) Foreign Application Priority Data

Apr. 20, 2015 (GB) .................................. 1506682.2

(51) Int. Cl.
*B23P 19/04* (2006.01)
*E05B 17/06* (2006.01)
*E05B 65/00* (2006.01)
*E05B 65/46* (2017.01)

(52) U.S. Cl.
CPC .......... *E05B 17/06* (2013.01); *E05B 65/0014* (2013.01); *E05B 65/46* (2013.01)

(58) Field of Classification Search
CPC . B23P 19/10; B23P 19/12; B23Q 3/00; B23Q 3/04
See application file for complete search history.

(56) References Cited

U.S. PATENT DOCUMENTS 5,626,372 A 5/1997 Vogt
5,875,535 A * 3/1999 Canoy ..................... B25B 27/04 29/275
6,029,335 A 2/2000 Hui et al.
6,250,730 B1 6/2001 Roth et al.
7,712,199 B1 * 5/2010 Wilson .................... E04F 21/22 254/25
7,971,329 B1 * 7/2011 Brohard .................. B25B 27/04 254/131
8,069,544 B2 * 12/2011 Sollami ................. B23B 31/003 29/254
9,655,310 B1 * 5/2017 Hernstedt ............ A01G 25/026
2016/0305159 A1 * 10/2016 Andersen ................ E05B 17/06

FOREIGN PATENT DOCUMENTS

CA 2417948 A1 8/2004

OTHER PUBLICATIONS

GB Search Report, Application No. GB1506682.2, dated Sep. 23, 2015, 4 pgs.

* cited by examiner

*Primary Examiner* — Lee D Wilson
(74) *Attorney, Agent, or Firm* — Fay Sharpe LLP

(57) ABSTRACT

A method of fitting a childproof latch fitting mechanism and a latch installation tool arranged to locate between a first latch fitting and a second latch fitting, to spatially locate the first and second latch fitting at a pre-determined distance respectfully one from the other, wherein in the installation tool is temporarily attached to the first and second latch fittings, whilst they are located and fixed, at least temporarily in place.

6 Claims, 3 Drawing Sheets

LATCH FITTING TOOL

REFERENCE TO RELATED APPLICATION

This application claims priority to and the benefit of UK patent application GB 1506682.2, filed Apr. 20, 2015 and entitled "LATCH FITTING TOOL", the entirety of which is hereby incorporated by reference.

The present invention relates to a latch fitting tool for latches for drawers, cabinet doors and the like, and, more particularly, to "child-proof" latches that include features which make them difficult to be actuated by small children.

BACKGROUND OF THE INVENTION

Drawers are commonly used in daily life in kitchens, bedrooms, offices, etc. to store a wide range of articles, some of which may be harmful to children. Small children may also attempt to climb on, or even in, drawers and cabinets in an effort to hide. Drawers and cabinets may house many types of materials which may be potentially hazardous to children such as medicines, household cleaners, knives, tools, paint, etc.

To prevent young children from accessing these storage areas, numerous items have been patented and sold, most of a multi-piece assembly. Generally, some sort of a longitudinal member with a hook portion is attached to the inside surface of a drawer or door to limit the amount the drawer or door may be opened. The hook portion may engage with a stop installed on a frame portion of the cabinet as the drawer or door is withdrawn. Only a small space may then remain for an adult to insert their finger to depress the longitudinal member such that the hook may clear the stop on the frame of the enclosure.

In many cases, these latches require at least two components, which need alignment during installation or adjustment after installation. These components generally include a stop portion, or catch, attached to the enclosure and a hook portion attached to the inside of the drawer. This mechanism may further require a biasing member (springs, etc.) to bias the hook member against the stop member.

What is needed is a "child-proof" safety latch that is easy to install on the inside surface of a drawer, or door, and which includes more than one action which must be actuated to release the latch. Thus, a drawer, or cabinet door, may only be partially opened and its contents kept secure from children. Upon actuation of the more than one action by an adult, the contents may become accessible.

It is thus an object of the present invention to provide a latch which may preferably be moulded of plastic to provide a low cost safety latch.

It is a further object of the present invention to provide a childproof safety latch which may be easily installed on the interior of a drawer or door without the need for taking measurements.

DETAILED DESCRIPTION

The present invention is described more fully hereinafter with reference to the accompanying drawings, in which preferred embodiments of the invention are shown. This invention, may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
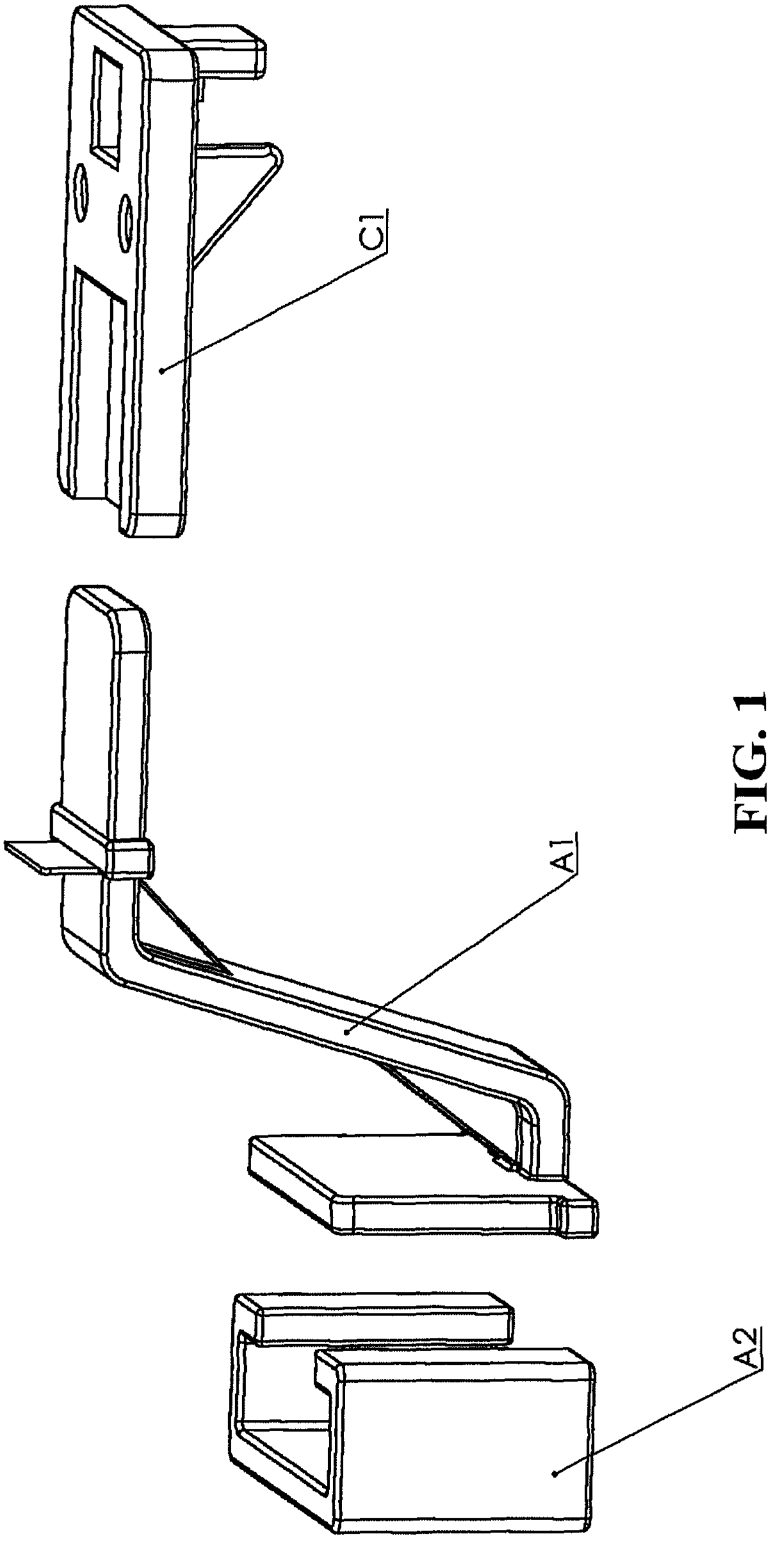
FIG. 1: shows a perspective view of an exemplary embodiment of the first part of the latch fitting mechanism of the invention.
Figure 2:
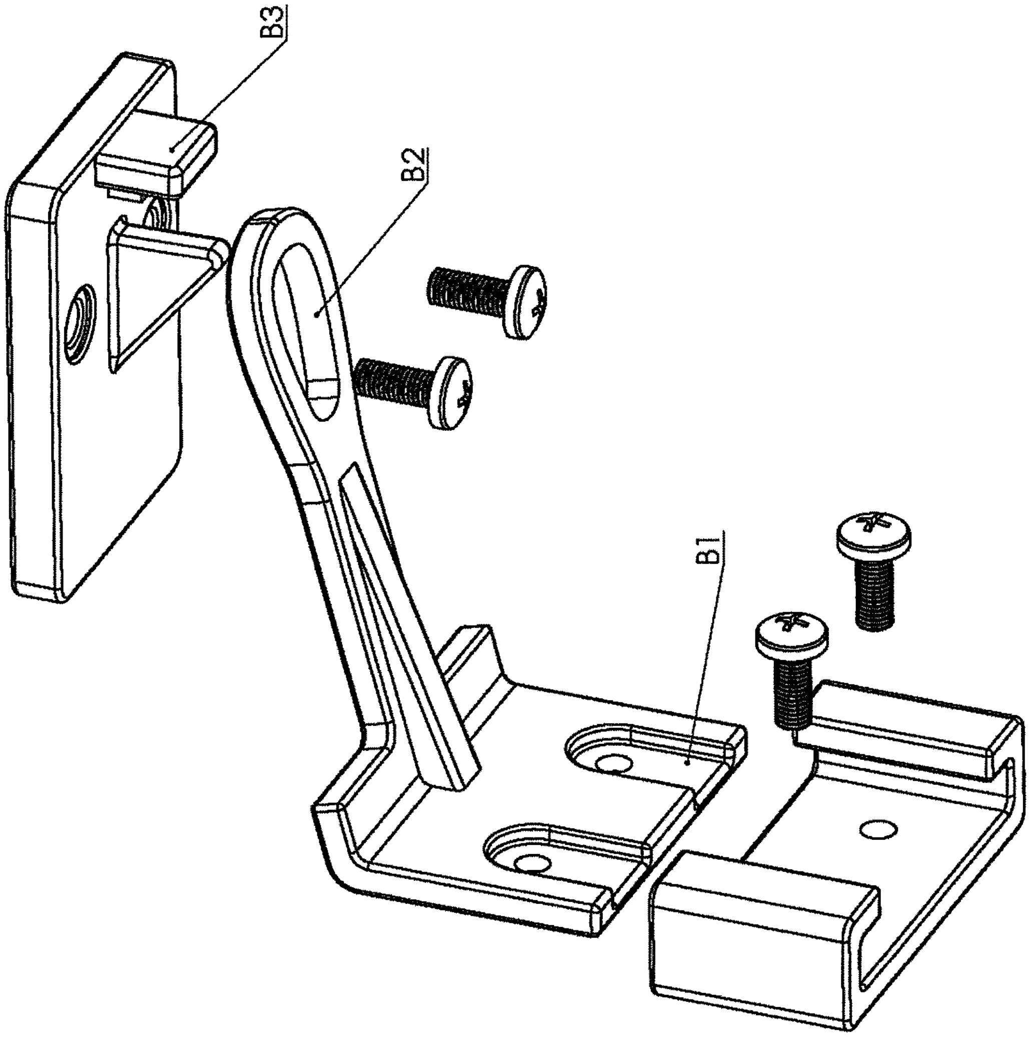
FIG. 2: shows a perspective view of an exemplary embodiment of a latch mechanism of the invention.

Referring now to FIG. 1, a first exemplary embodiment of a childproof latch fitting mechanism, according to the present invention, is illustrated in perspective view. The latch fitting mechanism includes a latch installation tool A1 arranged to locate between a first latch fitting A2 and a second latch fitting C1. Referring to FIG. 2, the latching member B1 includes a cantilever member B3 with a hollow or holed section B2 at its remote end, preferably but not limited to moulded of a resilient plastic. The childproof latch may be attached to the inner surface of a drawer to restrict the amount that the drawer may be easily opened. (A maximum of 30 mm is the European safety standards). The latching member B1 may comprise any longitudinal member B3 having a hook or detent portion B2 for engaging the second latch fitting C1 located on the cupboard encasement in which the drawer slides. The second latch fitting includes a protrusion or hook C2 for locating the latching member B1 relative to the drawer front and the top or the side of the drawer on the inside surface. Holes are provided in the first latch fitting A2 and the second latch fitting C1 for attachment to the inside surface of a side of the drawer or cupboard with mechanical fasteners, such as small nails or screws. Double-sided tape or hook-and-loop type fasteners, such as Velcro® may also be used. The holes are preferably at diverging angles to one another to assist in locating and securing the latch 10 to the inside of the drawer. By diverging the holes, after one nail or screw has secured the latch to the inside surface of a drawer, the other nail or screw may be driven in, and in doing so may tighten against the first. In addition, any force applied to the latch, as by opening or closing the drawer, may tighten the latch to the drawer.

It is also contemplated that the latch member B1 of the present invention is moulded such that, when fitted, the cantilever member B3 is urged against the second latch fitting to allow the respective walls of the drawer or cupboard to be offset one from the other.

Figure 3:
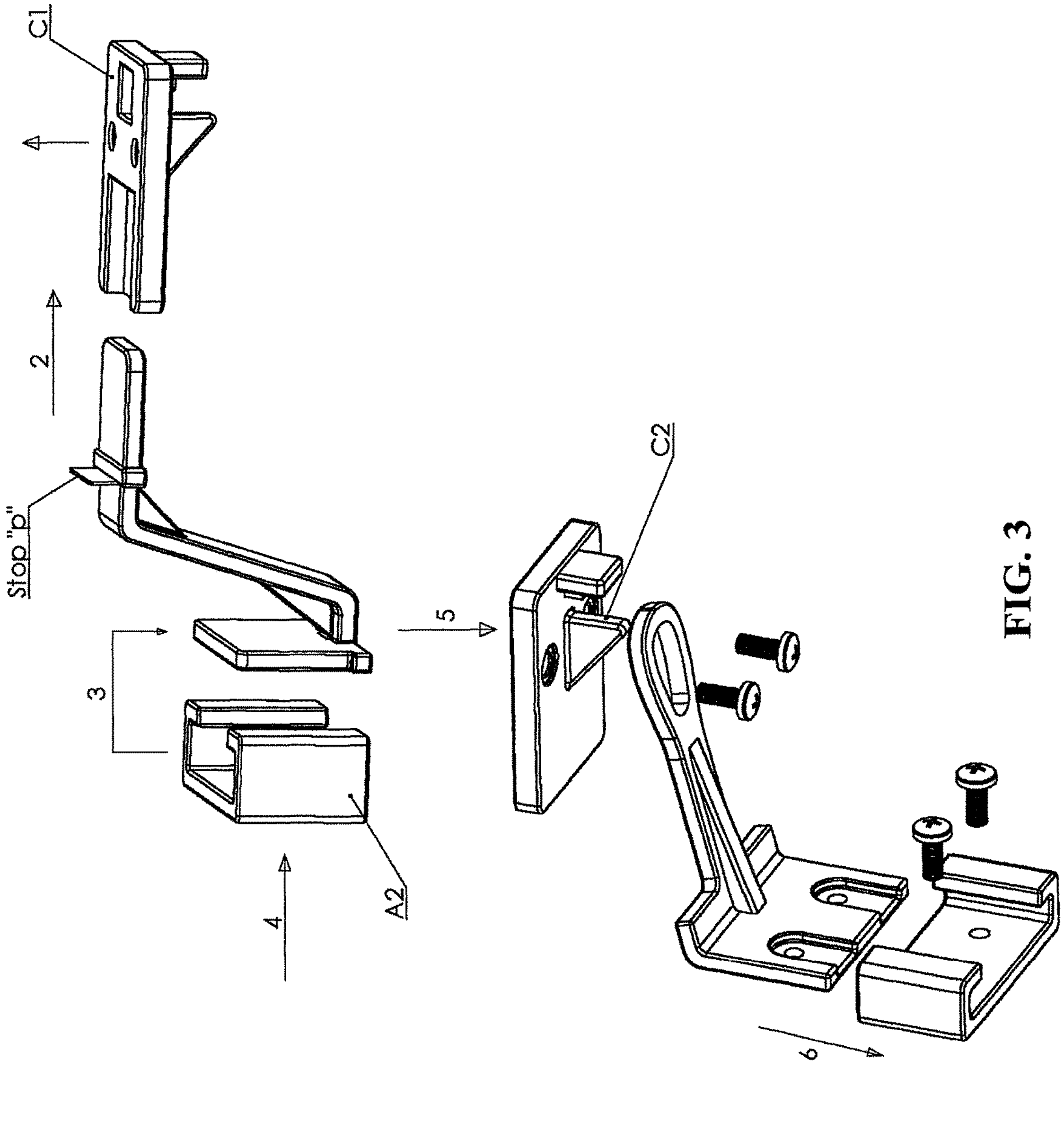
FIG. 3: shows a perspective view of an exemplary embodiment of the latch fitting mechanism and the latch mechanism of the present invention showing the fitting steps.

The method of fitting the latch mechanism according to the invention will now be described with reference to FIG. 3. In a first step the second latch fitting C1 is secured to the side wall of the cupboard or drawer carcase. In this embodiment the second latch fitting C1 is shown being secured upwardly against the carcase wall. It should be appreciated that "laterally" and "downward" are relative terms and that the latch may be installed in a plane essentially perpendicular from that shown in FIG. 3, as on a cabinet door. In that case the walls would be deflected downwardly (or upwardly) and the hook portion laterally (to the horizontal). It is further contemplated that the latch of the present invention may be installed at any angle, not just in a vertical or horizontal plane, including 180° from either horizontal or vertical, and all increments in between.

The second latch fitting C1 may conveniently be attached at least initially by means of pre-applied adhesive whilst the drawer is still in place, and the cupboard filled with contents, and optionally secured with screws later.

The location of the second latch fitting C1 in relation to the carcase wall is determined by a stop p located on the installation tool A1 when the installation tool A1 is inserted into a slot in the second latch fitting C1.

The first latch fitting A2 is now located, by sliding, on the opposite end of the installation tool A1. The first latch fitting A2 also has a pre-applied adhesive on its side opposite to the slide fitting to the installation tool A1.

The drawer or cupboard door is now closed and as a consequence the inside surface of the drawer or cupboard door comes into contact with the pre-applied adhesive on the first latch fitting A2. Thus the first latch fitting A2 and the installation tool A1 become attached to the inside surface of the drawer or cupboard door. The adhesive is sufficiently strong to permit the drawer or cupboard door to be opened with the first latch fitting A2 and installation tool A1 still attached, the installation tool A1 being releases from the sliding connection with the second latch fitting C1.

Once released from the second latch fitting C1, the installation tool A1 slidably falls from, or can be readily slidably removed from, the first latch fitting A2. The first latch fitting A2 and the second latch fitting C1 remain in their respective adhered positions on the respective drawer or cupboard door and carcase wall, and these are precisely correct positions for the latching member B1 due to the corresponding dimensions of the installation tool A1.

In the next step the latching member B1 is slid into the first latch fitting A2 secured in the fitted position by screws, which also pass through the first latching member A2 into the wall of the drawer or cupboard door, which also served to more thinly affix the first latching member A2. Screws may now be used to additionally more firmly secure the second latch fitting C1 to the carcase wall. Thus the latching mechanism is accurately positioned which will lead to its more effective and durable use.

Thus, a childproof latch is provided which may be easily installed on the inside of a closure member without power tools or the need to measure. The latch may allow partial opening of the closure member but requires an additional actions to be carried out so that the enclosure which the member closes may be freely accessed.

It should be understood that although specific embodiments of the present invention have been described herein in detail, such descriptions are for purposes of illustration only and modifications may be made thereto within the scope of the invention.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

The invention claimed is:

1. A latch installation tool arranged to locate between a first latch fitting and a second latch fitting, to spatially locate the first and second latch fitting at a pre-determined distance respectfully one from the other, wherein the tool includes first and second planar ends extending from a connecting portion, the first and second planar ends configured to releasably engage the first and second latch fittings after the second latch fitting is fixed in place such that the first fitting is supported at the predetermined distance from the second latch fitting by the latch installation tool, wherein the first end is adapted to slidingly engage the first latch fitting along a first axis, wherein the second end is adapted to slidingly engage the second latch fitting along a second axis, the first axis and second axis being orthogonal, wherein the first end extends away from an intersection of the first and second axes along the first axis and the second end extends towards the intersection of the axes along the second axis, and wherein the central portion has first and second complimentary non right angle bends between the first and second ends, whereby the second latch fitting can be mounted and the latch installation tool can be releasably engaged therewith by sliding along a horizontal axis such that the first fitting can be releasably engaged with the first end by sliding along a vertical axis to thereby support and locate the first latch fitting along a vertical surface.

2. A latch installation tool according to claim 1, wherein the tool includes a stop abutment to locate the tool against the edge of a cupboard or drawer door or carcase.

3. A childproof latch fitting system for a drawer or cupboard comprising:

a first latch fitting mountable to the drawer or a door of the cupboard;

a second latch fitting mountable to a carcase of the drawer or a wall of the cupboard; and a latch installation tool to spatially locate the first and second latch fittings at a pre-determined distance respectfully one from the other, wherein the tool includes first and second ends extending from a connecting portion, the first and second ends configured to releasably engage the first and second latch fittings after the second latch fitting is fixed in place to the carcase of the drawer or wall of the cupboard and prior to the first latch fitting being fixed to the cupboard door or drawer, such that the first latch fitting is supported at the predetermined distance from the second latch fitting by the latch installation tool;

wherein the first end is adapted to slidingly engage the first latch fitting along a first axis;

wherein the second end is adapted to slidingly engage the second latch fitting along a second axis;

wherein the first axis and second axis are orthogonal;

wherein the first end extends away from an intersection of the first and second axes along the first axis and the second end extends towards the intersection of the axes along the second axis, and wherein the central portion has first and second complimentary non right angle bends between the first and second ends whereby the second latch fitting can be mounted and the latch installation tool can be releasably engaged therewith by sliding along a horizontal axis such that the first latch fitting can be releasably engaged with the first end by sliding along a vertical axis to thereby support and locate the first latch fitting on a vertical surface.

4. A childproof latch fitting system according to claim 3, wherein the tool is adapted to attach to the second latch fitting by sliding in a direction parallel to a direction of movement of the drawer or cupboard door.

5. A childproof latch fitting system according to claim 4, wherein the first latch fitting further includes adhesive on its side opposite to the side fitting to the tool, whereby upon closing of the cupboard door or drawer an inside surface of the drawer or cupboard door comes into contact with the adhesive on the first latch fitting and upon subsequent opening of the drawer or cupboard door the tool releases from the second latch fitting.

6. A childproof latch fitting system according to claim 3, further comprising a latching member attachable to the second latch fitting, the latching member configured to releasably engage with the first latch member when the drawer or cupboard door is closed.

* * * * *